Nov. 11, 1952      O. HUSEBY      2,617,229
INSECT COLLECTING AND DESTROYING MACHINE
Filed Feb. 20, 1950      5 Sheets-Sheet 5

O. Huseby
INVENTOR
BY C.A.Snow&Co.
ATTORNEYS.

Patented Nov. 11, 1952

2,617,229

UNITED STATES PATENT OFFICE 2,617,229

INSECT COLLECTING AND DESTROYING MACHINE

Oscar Huseby, Marlin, Tex.

Application February 20, 1950, Serial No. 145,156

3 Claims. (Cl. 43—143)

1

This invention relates to a machine designed primarily for use in removing insects and destructive bugs such as boll weevil from growing cotton plants.

An important object of the invention is to provide a machine of this character which may be moved along rows of growing plants, the plants being subjected to agitating means for shaking the plants and causing the insects to be dislodged from the plants where they will fall onto endless conveyor belts and be moved between crushing rolls and crushing or destroying the insects.

Another object of the invention is to provide means for setting up an air floor between the troughs and belts of the machine to prevent any possibility of the insects falling between the troughs and belts, and escaping.

A further object of the invention is the provision of means for elevating the lowermost branches and leaves of the plants under treatment, to position the branches and leaves where they will be in a direct line with the agitating members which shake the leaves and cause the insects to fall therefrom.

With the foregoing and other objects in view which will appear as the description proceeds, the invention consists of certain novel details of construction and combinations of parts, hereinafter more fully described and pointed out in the claims, it being understood that changes may be made in the construction and arrangement of parts without departing from the spirit of the invention as claimed.

Referring to the drawings.

Figure 2:
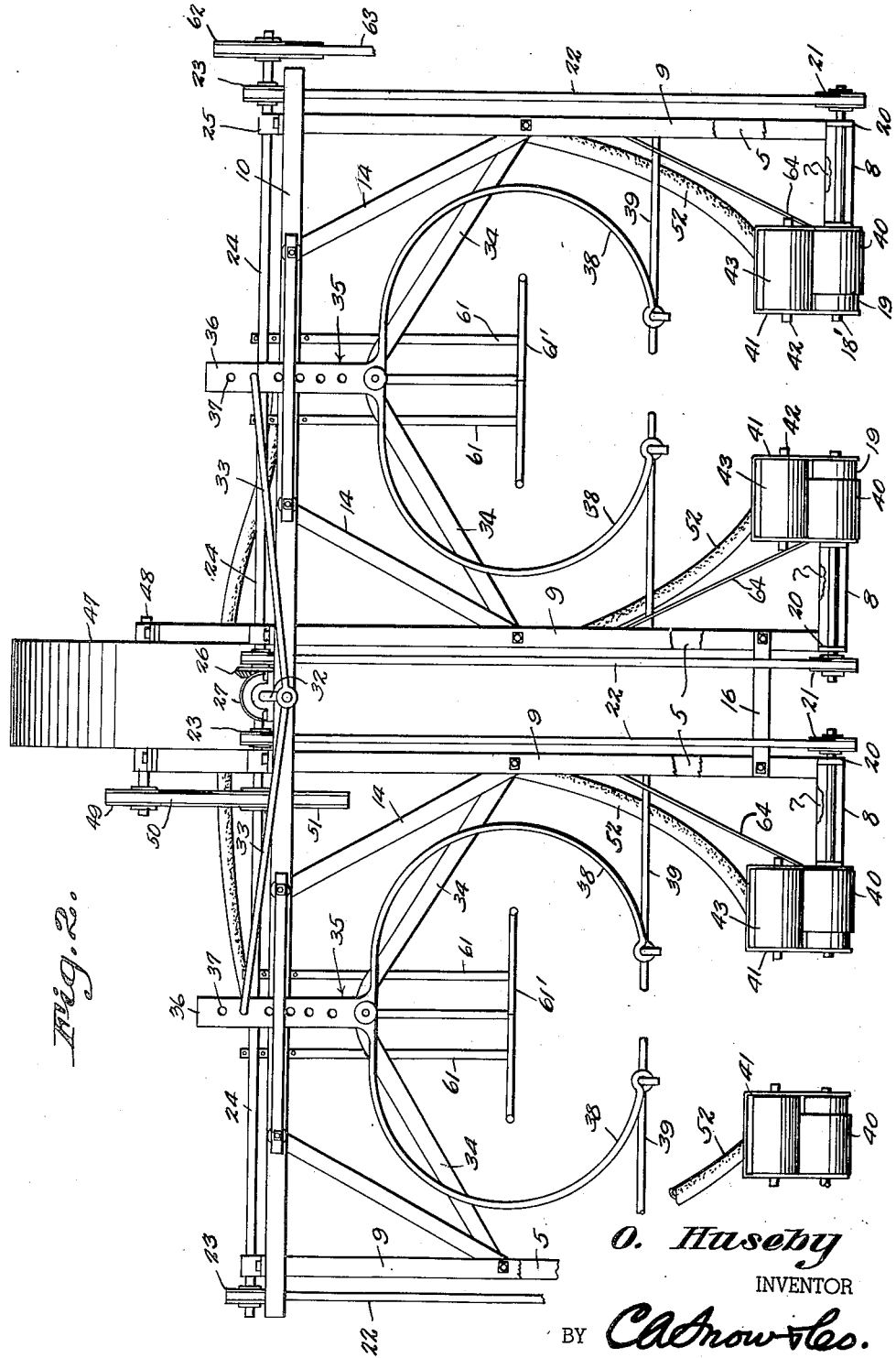
Fig. 2 is a rear elevational view of the machine.
Figure 3:
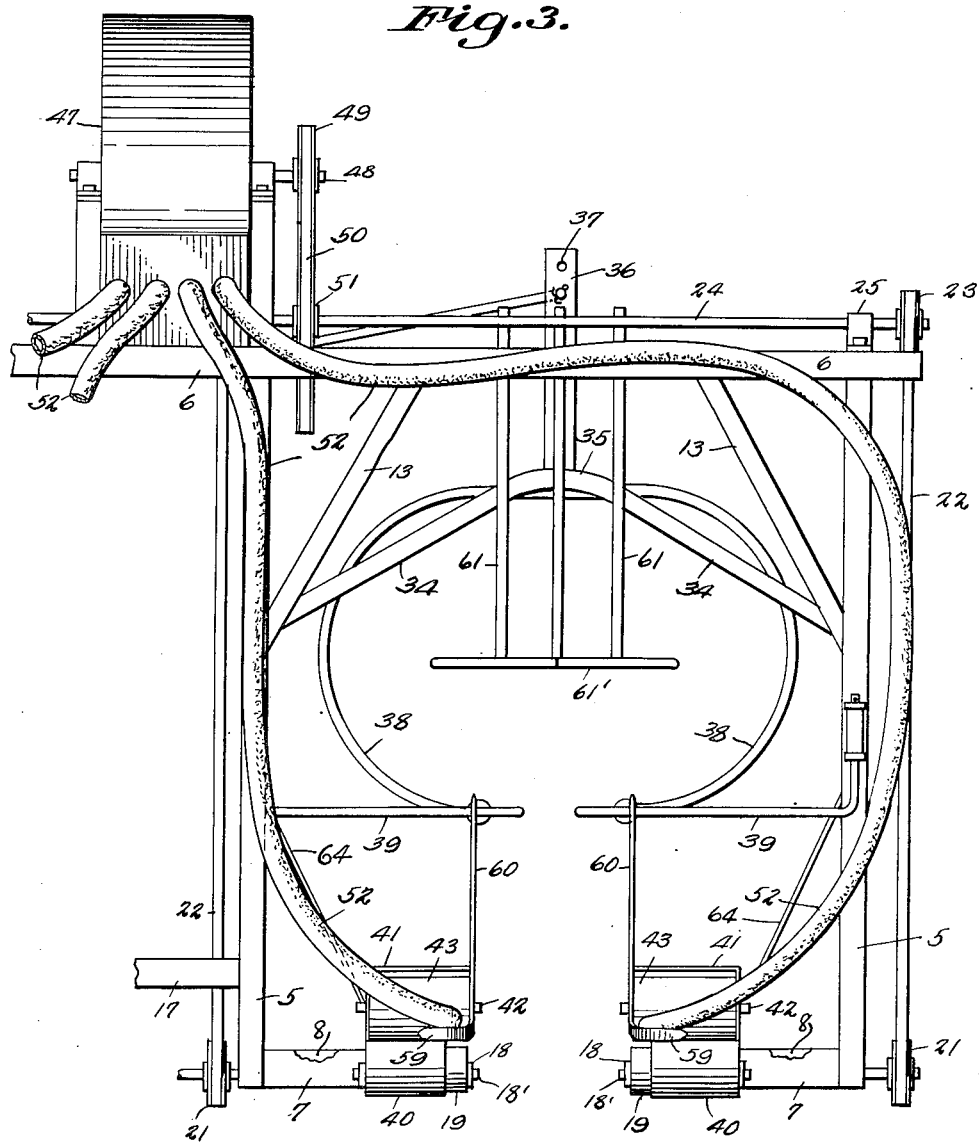
Fig. 3 is a front elevational view illustrating one of the units of the machine on a slightly enlarged scale.
Figure 4:
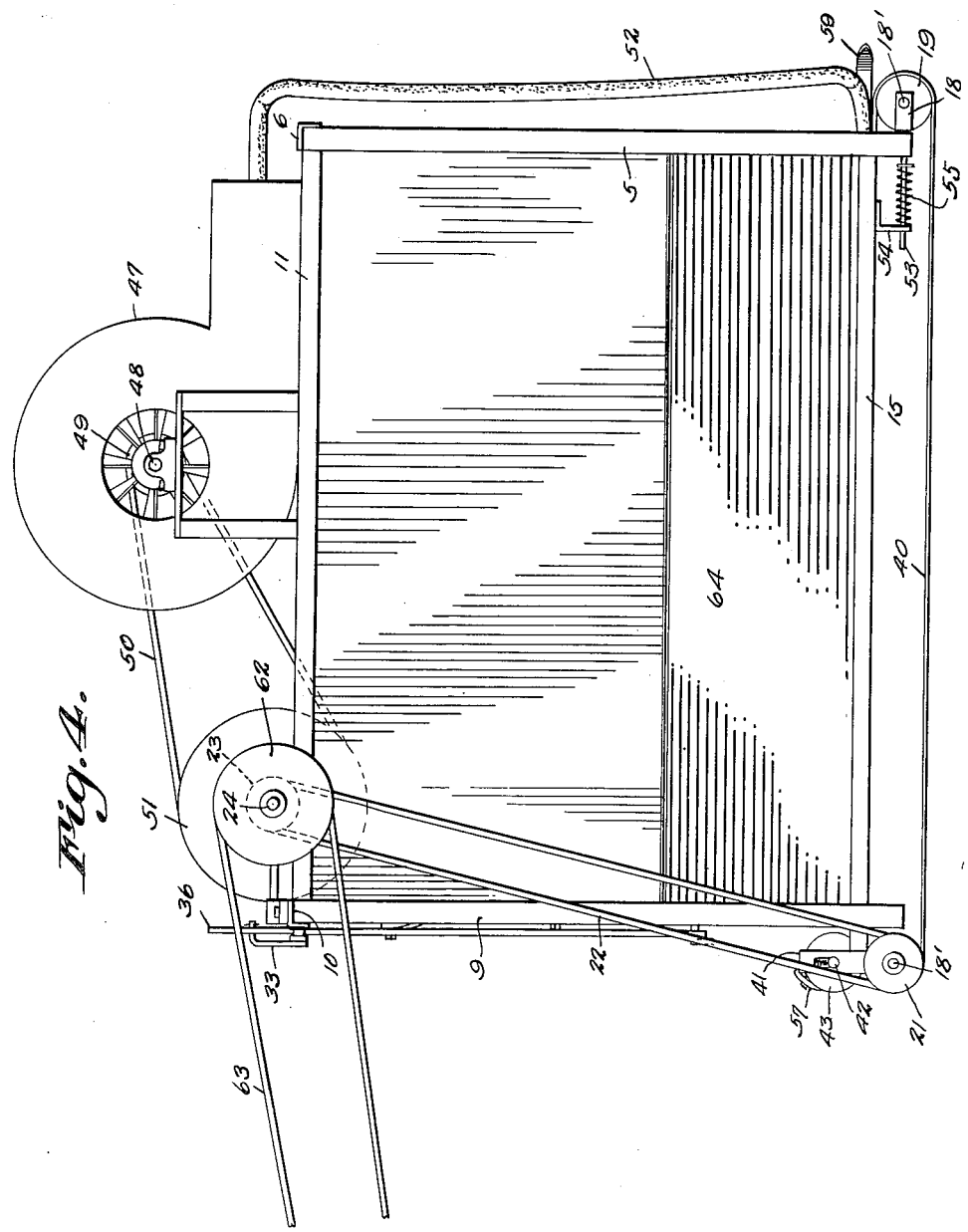
Fig. 4 is a side elevational view of the machine.
Figure 5:
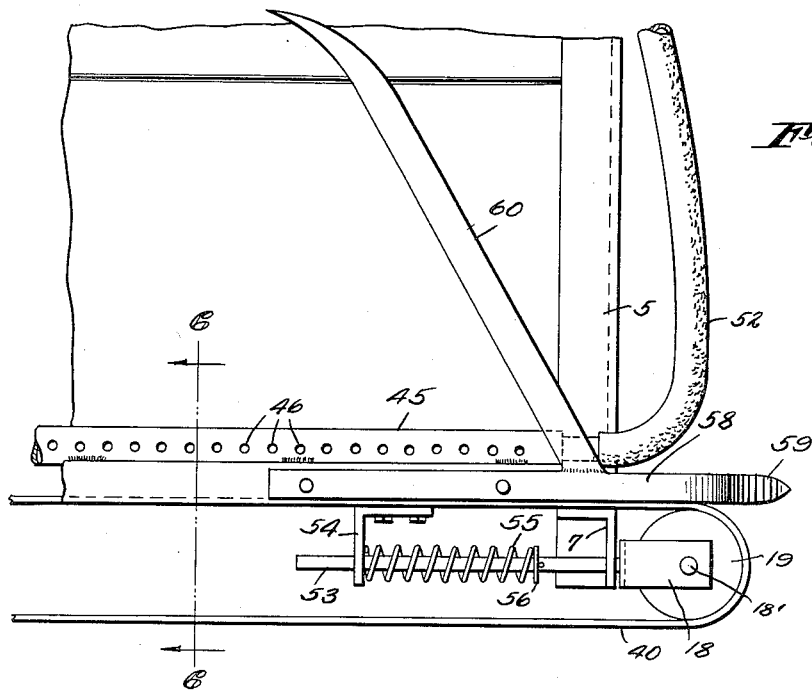
Fig. 5 is an enlarged elevational view, illustrating one side of one of the units of the machine.

Referring to the drawings in detail, the machine comprises a frame embodying front vertical bars 5 that have their upper ends connected to the upper horizontal bar 6 at the front of the machine, the frame constituting two separate units, each unit embodying the vertical bars 5, as clearly shown by Fig. 2 of the drawings.

Connected with the lower ends of the vertical bars 5 of each unit, are inwardly extended end bars 7 that are connected with inwardly extended end bars 8 that are secured to the vertical rear bars 9 which correspond to the vertical bars 5 at the front of the machine. The bars 9 are connected with the upper horizontal rear bar 10, the bars 6 and 10 being held in spaced relation by means of the upper horizontal bars 11 that extend transversely of the machine. To brace the frame of the machine, transverse bars 12 extend across the frame of the machine in parallel spaced relation with respect to each other. Angularly disposed brace bars 13 connect adjacent bars 5 and 6 at the front of the machine, while angularly disposed brace bars 14 connect the bars 9 and 10 at the rear of the machine.

Figure 1:
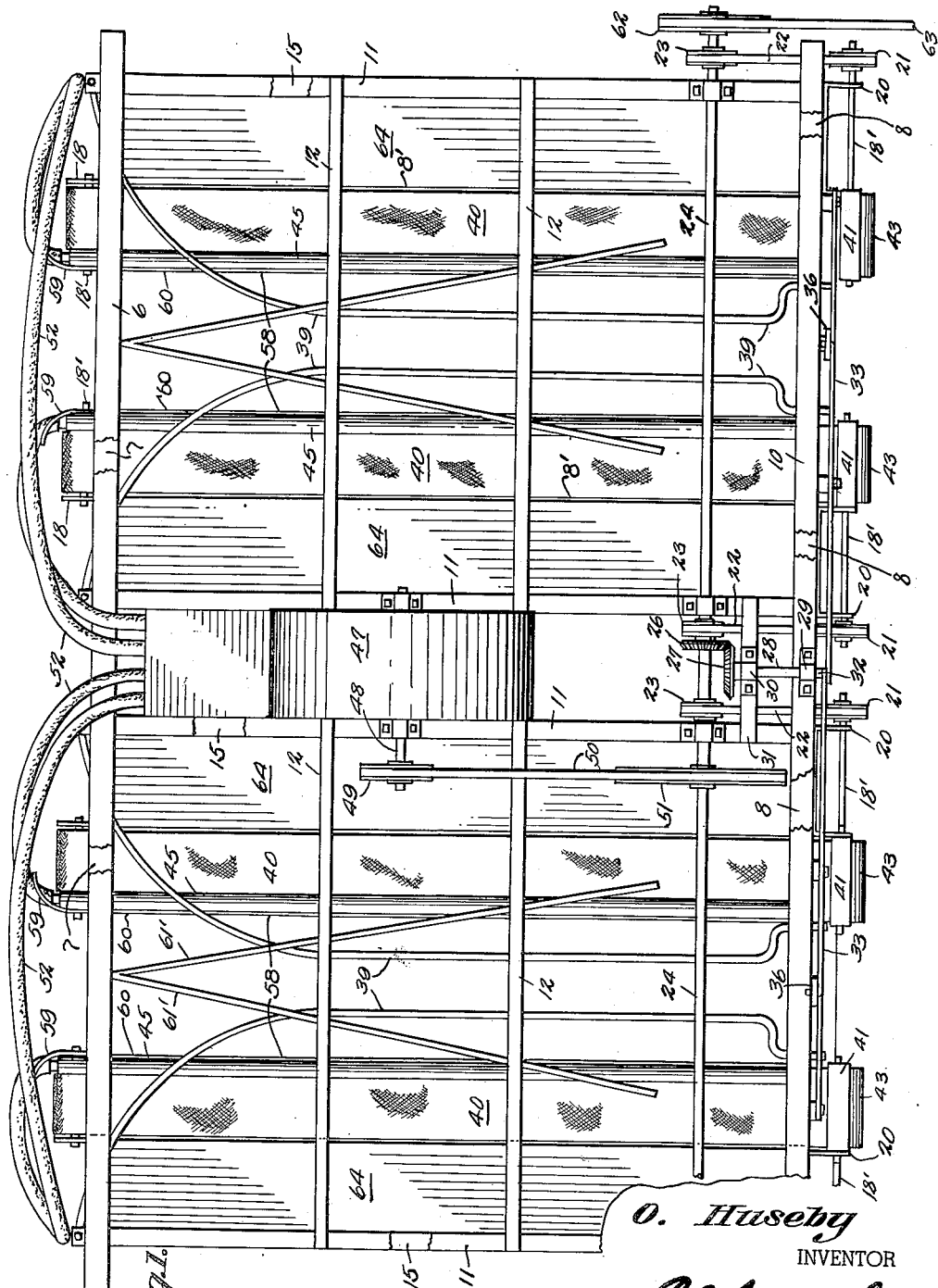
Figure 1 is a plan view of a machine for removing insects from growing plants, constructed in accordance with the invention.

As clearly shown by Figs. 1 and 2 of the drawings, the bars 7 at the front end of the machine are connected with the bars 8 at the rear end of the machine, by means of horizontal bars 15, to hold the bars 7 and 8 in proper spaced relation.

The bars 9 at the center of the machine, and which form the inner bars of the units of the machine, are braced by means of the bars 16, while the front bars 5 of the adjacent units are connected by the brace bars 17.

Mounted on the bars 7 and 8, are bearings 18 in which the shafts 18' of the belt rollers 19 are mounted while at the rear of the machine are bearings 20 in which the extensions of the shafts 18' are mounted, the shafts 18' at the rear of the machine providing supports for the pulleys 21 over which the belts 22 operate, the belts 22 also operating over the pulleys 23 that are mounted on the upper horizontal power shaft 24 that in turn is mounted in bearings 25 secured to the upper bars 11, as clearly shown by Fig. 1 of the drawings.

Secured to the power shaft 24, at a point intermediate its ends, is the pinion 26 that meshes with the pinion 27 carried at the inner end of the shaft 28 mounted in bearings 29 and 30 secured to the bars 10 and 31 respectively. The outer end of the shaft 28 is formed with a crank arm 32 to which the rods 33 are pivotally connected, the rods 33 extending to points adjacent to the centers of the units.

At the rear ends of the units of the machine are inverted V-shaped supporting bars 34 that provide supports for the pivoted hangers 35 that include upwardly extended bars 36 formed with lines of openings 37 into which the right angled ends of the rods 33 extend, connecting the hangers with the rods 33.

The hangers also include curved arms 38 that connect with the rear ends of the agitators 39, which agitators embody spaced rods extending throughout the lengths of the units, the rods being arranged in pairs and converging towards the rear ends of the machine, the forward ends of the rods being extended laterally where they are connected with the vertical bars 5 at the front of the machine.

The spaces between these agitators are directly over the spaces between the endless carrier belts 40, the spaces between the adjacent bars of the agitators being appreciably less than the space or distances between adjacent belts 40.

Due to this construction, it will be seen that as the crank arm 32 rotates, the bars 36 will be rocked, which in turn rock the curved arms 38 to contact the rows of plants through which the machine is being moved, with the result that insects on the plants will be knocked from the plants onto the endless conveyor belts 40 operating over the rollers 19 at the front and rear of the machine. At the rear of each unit, and disposed directly over each roller 19, is an upstanding frame 41 which is formed with openings in which the shafts 42 of the crushing rolls 43 are disposed, the crushing rolls being biased towards the belts 40 by the springs 41' and are so located that they will move in contact with the endless conveyor belts 40 to crush insects that have been knocked onto the belts 40.

Figure 6:
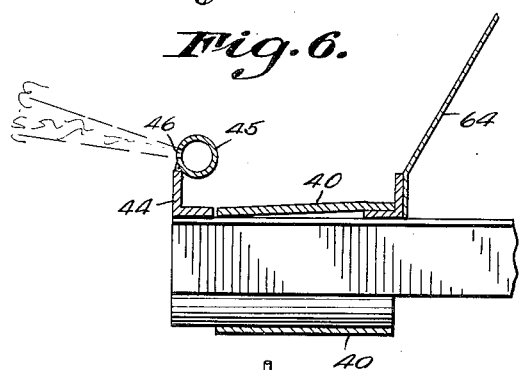
Fig. 6 is a sectional view taken on line 6—6 of Fig. 5.
Figure 7:
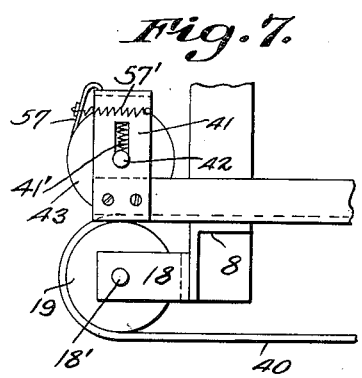
Fig. 7 is an enlarged elevational view illustrating the action of the crushing rolls operating over the endless conveyor belts.
Figure 8:
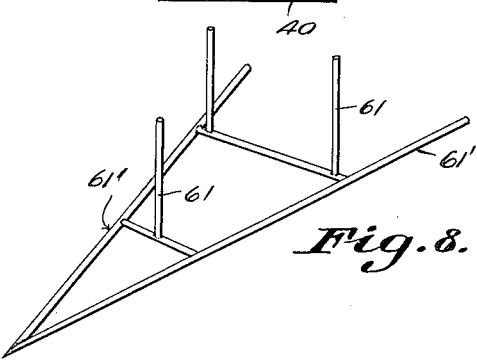
Fig. 8 is a perspective view of one of the V-shaped stalk dividers of the machine.

As clearly shown by Fig. 6 of the drawings, the endless conveyor belts 40 operate through the troughs 44, there being provided a pair of these spaced troughs, forming a part of each machine unit.

Secured along the upper longitudinal edge of each trough at the inner side of each trough is a pipe 45, the pipes 45 of the troughs being provided with a plurality of discharge openings 46. These pipes 45 are connected with the blower housing 47 in which a blower operates, the blower being mounted on the shaft 48 that carries the pulley 49 over which the belt 50 operates, the belt 50 also operating over the substantially large pulley 51 secured to the power shaft 24, as shown by Fig. 1 of the drawings.

The communication between the pipes 45 and blower housing 47 is made through the hose 52.

The discharge openings of the pipes 45 are so disposed with respect to each other that a floor of air is provided across the space between the pipes to prevent the insects which have been dislodged by the agitator, from falling to the ground surface through the space between the endless carrier belts 40.

The bearings 18 are secured to the forward ends of the rods 53 that extend through openings in the bars 7 at the front of the machine, the rods 53 also passing through openings in the brackets 54, the rods 53 being normally urged forwardly, by means of the coiled springs 55 that are placed under tension between the front edges of the brackets 54 and the stops 56 provided on the rods 53. This structure is one which will maintain the endless conveyor belts taut at all times.

It might be further stated that the crushing rolls 43 which cooperate with the rollers 19 and belts 40 operating thereover are mounted in yieldable bearings to compensate for a variation in the quantity of insects carried under the rollers.

Cooperating with each crushing roll 43 is a scraping blade 57 which operates to scrape the insects from the crushing roll and deposit them on the ground surface, the blades 57 being held into contact with the rollers 43 by the springs 57'.

Disposed above each of the belt rollers 19 is a bar 58 that extends forwardly and laterally as at 59, the forwardly and laterally extended portions of the bars 58 providing guides to guide the plants into the space between the endless conveyor belts and troughs.

Forming a part of each of these bars 58 is a rearwardly extended arm 60 that moves under the lower branches and leaves of the plants elevating them to positions where they will be engaged by the agitators to dislodge the insects therefrom.

Suspended from the upper bars of the frame of the machine, by means of the rods 61, are V-shaped dividing members 61', the dividing members being so supported that when the machine moves along a row of plants, the dividing members will move through the plants dividing the plants and moving substantially one half of the vine or plant structure over one trough, and the remaining portion of the plant over the opposite trough, so that the insects knocked therefrom will fall readily into the troughs where they will be carried through the troughs by the endless conveyor belts.

The power shaft 24 is operated by means of the pulley 62 mounted on one end thereof, the belt 63 taking off power from a suitable power shaft and pulley not shown.

In order that the insects that are thrown laterally by the agitators 39 will be directed into the troughs 44, inclined guard plates 64 are mounted along the upper outer edges of the troughs, onto which the insects fall and gravitate onto the belts 40 operating through the troughs.

It will of course be understood that the machine may be either mounted on a truck, or supported on wheels to be pulled by a tractor or the like, and when the machine is moved along rows of growing plants, the agitators will contact the plants knocking the insects therefrom which fall onto the endless conveyor belts where they are carried under the crushing rolls 43 to destroy the insects which are then deposited on the ground surface.

In view of the foregoing detailed description, it is believed that a further description as to the operation of the device is unnecessary.

Having thus described the invention, what is claimed is:

1. In a machine for removing insects from rows of growing plants, a frame embodying a pair of units, spaced troughs extending longitudinally of each unit, belt rollers mounted at the forward and rear ends of the units, belts operating over the belt rollers, a crushing roll supported above the belt rollers at one end of the machine and cooperating with the belt rollers directly thereunder for crushing insects therebetween, agitating members supported directly above the troughs for engagement with plants over which the machine moves for knocking insects from the plants onto the belts, elongated horizontally disposed V-shaped plant dividing members disposed directly over the space between adjacent troughs, the pointed ends of said dividing members being disposed forwardly and adapted to divide the plants laterally forcing the plants over the troughs for engagement by said agitating members, and rearwardly extended arms supported adjacent to the forward end of each unit adapted to engage under the lower leaves of plants elevating the lower leaves of the plants to positions in the paths of travel of the agitating members.

2. In a machine for removing insects from rows of growing plants, a frame embodying a pair of spaced units, troughs extending longitudinally of each unit providing a space adapted to straddle rows of growing plants, endless conveyor belts operating longitudinally of the troughs, crushing rolls mounted at the rear ends of the troughs for crushing insects falling onto said conveyor belts, horizontally disposed pipes arranged along the adjacent inner edges of said troughs, said pipes having discharge openings, the discharge openings of one pipe being disposed towards the discharge openings of the adjacent pipe through which an air blast is directed across the space between the troughs preventing insects from falling through the space between the troughs, and oscillating agitating members operating above the troughs adapted to dislodge insects from plants as the machine moves thereover.

3. In a machine for removing insects from rows of growing plants, a frame embodying a pair of units, horizontally spaced troughs extending longitudinally of each unit providing a space accommodating the plants over which the machine moves, endless conveyor belts operating longitudinally of the troughs, agitators comprising pivoted hangers mounted within the frame, arms curved in the arcs of circles, depending from said hangers, disposed over the space between the troughs, the lower ends of said curved arms being spaced apart providing a clearance for growing plants over which the machine moves, and V-shaped horizontally disposed dividing members hung between the spaced ends of the curved arms dividing the plants laterally between said curved arms and directing the plants onto said endless conveyor belts and means for oscillating said agitators.

OSCAR HUSEBY.

REFERENCES CITED

The following references are of record in the file of this patent:

UNITED STATES PATENTS

| Number | Name | Date |
|---|---|---|
| 766,099 | Bussell | July 26, 1904 |
| 931,440 | Lindahl | Aug. 17, 1909 |
| 1,087,214 | Chandler | Feb. 17, 1914 |
| 1,257,343 | Harper | Feb. 26, 1918 |
| 1,344,119 | Drake | June 22, 1920 |
| 1,402,960 | Rannefeld | Jan. 10, 1922 |
| 1,482,785 | Coolidge | Feb. 5, 1924 |
| 1,519,922 | Moran | Dec. 16, 1924 |